US012587860B2

(12) United States Patent
Vattakulla et al.

(10) Patent No.: US 12,587,860 B2
(45) Date of Patent: Mar. 24, 2026

(54) METHOD AND SYSTEM FOR SECURED PAIRING FOR DATA COMMUNICATION BETWEEN AN EDGE NODE AND A BLUETOOTH DEVICE

(71) Applicant: HONEYWELL INTERNATIONAL INC., Charlotte, NC (US)

(72) Inventors: Lokesh Vattakulla, Bangalore (IN); SivaKumar Balla, Bangalore (IN); Pramod Masur, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 233 days.

(21) Appl. No.: 18/329,246

(22) Filed: Jun. 5, 2023

(65) Prior Publication Data

US 2024/0334194 A1      Oct. 3, 2024

(30) Foreign Application Priority Data

Mar. 29, 2023    (IN) .............................. 202311023134

(51) Int. Cl.
*H04L 29/06*          (2006.01)
*H04W 12/0471*        (2021.01)
(Continued)

(52) U.S. Cl.
CPC ....... *H04W 12/50* (2021.01); *H04W 12/0471* (2021.01); *H04W 12/069* (2021.01)

(58) Field of Classification Search
CPC ............. H04W 12/50; H04W 12/0471; H04W 12/069
See application file for complete search history.

(56) References Cited

U.S. PATENT DOCUMENTS 7,860,456 B2    12/2010  Kim
9,538,372 B2     1/2017  Li
(Continued)

FOREIGN PATENT DOCUMENTS

CN        113905359 A      1/2022
EP          3599599 A1     1/2020

OTHER PUBLICATIONS

Janc, Szymon, "Bluetooth on modern Linux Embedded Linux Conference", San Diego, 2016.
(Continued)

*Primary Examiner* — Evans Desrosiers
(74) *Attorney, Agent, or Firm* — Ingrassia Fisher & Lorenz LLP

(57)          ABSTRACT
Methods and systems have been developed for establishing a secured connection for data transmission. A first digital certificate is generated for a non-display device. This first digital certificate verifies the identity of the non-display device and enables encrypted connections. A second digital certificate is generated for a mobile device that uses a Bluetooth wireless communications standard protocol. The second digital certificate verifies the identity of the mobile device and enables encrypted connections. The mobile device then scans for a generic attribute (GATT) Bluetooth profile of the non-display device. Upon matching GATT properties, an encrypted connection that utilizes the Bluetooth protocol is initiated between the non-display mobile devices. An encrypted data channel is established between the non-display device and the mobile device upon successfully pairing the non-display device and the mobile device by exchanging the first digital certificate and the second digital certificate for authentication and exchanging RSA encryption keys.

18 Claims, 4 Drawing Sheets

(51) Int. Cl.
  *H04W 12/069*  (2021.01)
  *H04W 12/50*  (2021.01)

(56)                References Cited

U.S. PATENT DOCUMENTS

| | | |
|---|---|---|
| 9,769,658 B2 | 9/2017 | Dolev et al. |
| 10,064,040 B2 | 8/2018 | Lo |
| 10,764,749 B2 | 9/2020 | Judd et al. |
| 10,924,266 B2 | 2/2021 | Ohtani et al. |
| 11,251,978 B2 | 2/2022 | Ingraham et al. |
| 11,582,611 B1 | 2/2023 | Kwong et al. |
| 2016/0037337 A1* | 2/2016 | Elliott .................. H04L 63/105 |
| | | 713/168 |
| 2017/0097915 A1* | 4/2017 | Pronto ............... G06F 13/4068 |
| 2017/0295154 A1 | 10/2017 | Jackson et al. |
| 2022/0377550 A1* | 11/2022 | Mataic ................. H04L 9/3247 |

OTHER PUBLICATIONS

Service Discovery Protocol (SDP) Part E Bluetooth Specification Version 1.0 B, Nov. 29, 1999.
Cingolani, Alessandro, "Bluetooth Stack and how Linux OS handles it," Technical Report Jul. 2020 See discussions, stats, and author profiles for this publication at: https://www.researchgate.net/publication/345032366.
Huang, Albert and Rudolph, Larry, "Bluetooth for Programmers", Copyright © 2005.
Honeywell Bluetooth security modes Solution No. KB-000002271 Created Date: Aug. 10, 2008 Last modified: Oct. 9, 2008. Revision: 1.1.

* cited by examiner

300

302

Host

Generic Access Profile (GAP)

Generic Attribute Profile (GATT)

Security Manager (SM)

Attribute Protocol (ATT)

Logical Link Control and Adaption Protocol (L2CAP)

Controller

304

Host - Controller Interface (HCI)

Link Layer (LL)

Physical Layer (PHY)

400

METHOD AND SYSTEM FOR SECURED PAIRING FOR DATA COMMUNICATION BETWEEN AN EDGE NODE AND A BLUETOOTH DEVICE

CROSS REFERENCE TO RELATED APPLICATION

The present application claims benefit of prior filed India Provisional Patent Application No. 20/231,1023134, filed Mar. 29, 2023, which is hereby incorporated by reference herein in its entirety.

TECHNICAL FIELD

The present invention generally relates to secured data transmission connections, and more particularly relates to a secured paring for data communications between an edge node on a aircraft and a Bluetooth device.

BACKGROUND

With the increased use and adoption of connected data devices, a growing demand is seen for real time data sharing and communication. For example, there is a significant need for secure and reliable communication from an aircraft avionics line replaceable unit (LRU) and available on hand-held mobile device (like iPad and iPhone), for quick diagnostics and operations support. Hence, there is a need for a secured paring for data communications between an edge node on a aircraft and a Bluetooth device.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for establishing a secured connection for data transmission. The method comprises: generating a first digital certificate for a non-display device, where the first digital certificate verifies the identity of the non-display device and enables encrypted connections; generating a second digital certificate for a mobile device that uses a Bluetooth wireless communications standard protocol, where the second digital certificate verifies the identity of the mobile device and enables encrypted connections; scanning for a generic attribute (GATT) Bluetooth profile of the non-display device with the mobile device; initiating an encrypted connection between the non-display device and the mobile device upon matching GATT properties, where the encrypted connection utilizes the Bluetooth wireless communications standard protocol; and establishing an encrypted data channel between the non-display device and the mobile device upon successfully pairing the non-display device and the mobile device by, exchanging the first digital certificate and the second digital certificate for authentication, and exchanging RSA encryption keys between the non-display device and the mobile device for data encryption.

A system is provided for establishing a secured connection for data transmission. The system comprises: a non-display device that generates a first digital certificate that verifies the identity of the non-display device and enables encrypted connections; a mobile device that uses a Bluetooth wireless communications standard protocol, where the mobile device generates a second digital certificate that verifies the identity of the mobile device and enables encrypted connections; and a data communications network that, scans for a generic attribute (GATT) Bluetooth profile of the non-display device with the mobile device, initiates an encrypted connection between the non-display device and the mobile device upon matching GATT properties, where the encrypted connection utilizes the Bluetooth wireless communications standard protocol, and establishes an encrypted data channel between the non-display device and the mobile device upon successfully pairing the non-display device and the mobile device by, exchanging the first digital certificate and the second digital certificate for authentication, and exchanging RSA encryption keys between the non-display device and the mobile device for data encryption.

Furthermore, other desirable features and characteristics of the establishment of a secured connection for data transmission will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Embodiments of the subject matter described herein relate to an existing module integrated, incorporated, or otherwise instantiated for interoperability and use with other existing components of the vehicle system. For purposes of explanation, the subject matter is described herein primarily in the context of aircraft, however, the subject matter is not necessarily limited to use with aircraft and may be implemented in an equivalent manner for other types vehicles (e.g., automotive vehicles, marine vessels, or the like).

Methods and systems have been developed for establishing a secured connection for data transmission. A first digital certificate is generated for a non-display device. This first digital certificate verifies the identity of the non-display device and enables encrypted connections. A second digital certificate is generated for a mobile device that uses a Bluetooth wireless communications standard protocol. The second digital certificate verifies the identity of the mobile device and enables encrypted connections. The mobile device then scans for a generic attribute (GATT) Bluetooth profile of the non-display device. Upon matching GATT properties, an encrypted connection that utilizes the Bluetooth wireless communications standard protocol is initiated between the non-display device and the mobile device. An encrypted data channel is established between the non-display device and the mobile device upon successfully pairing the non-display device and the mobile device by exchanging the first digital certificate and the second digital certificate for authentication and exchanging RSA encryption keys.

Figure 1:
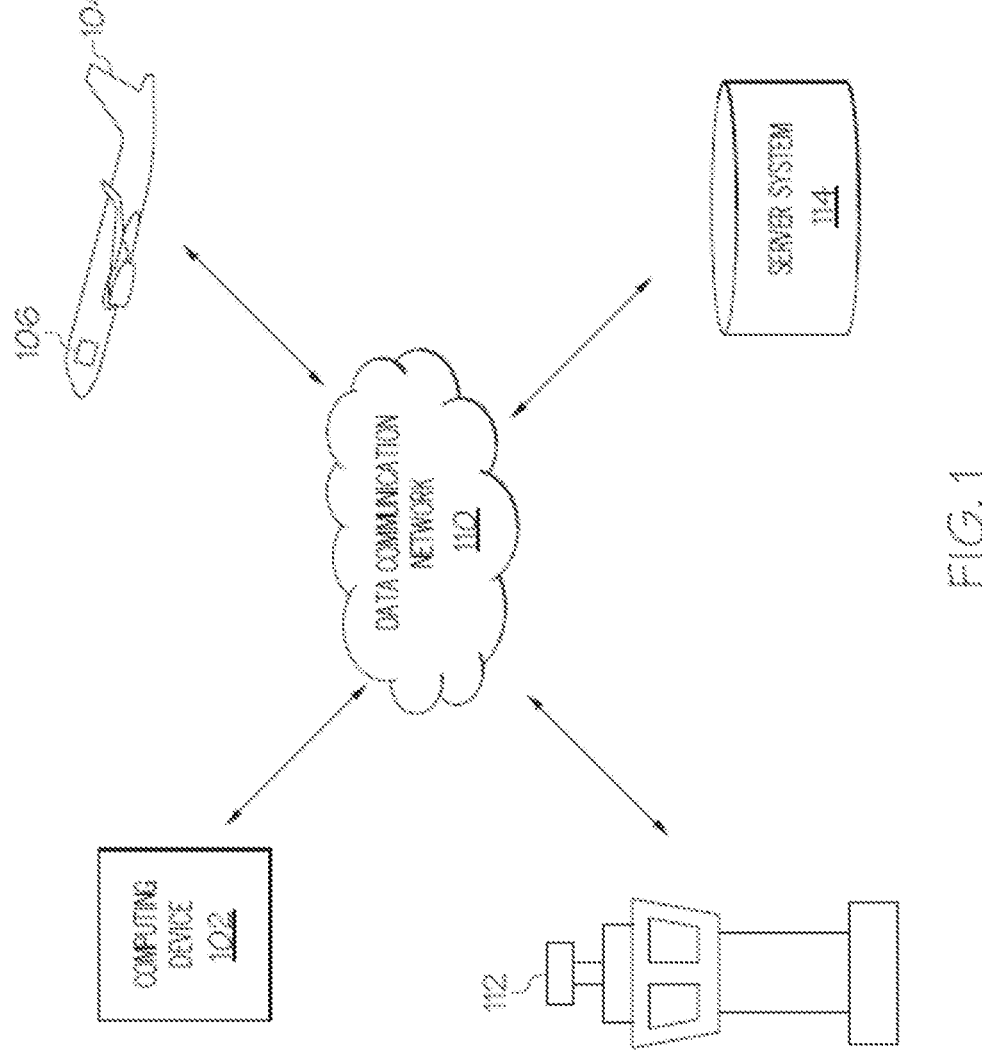
FIG. 1 depicts a diagram of aircraft computer system in accordance with the disclosed embodiments.

In the examples provided, an aircraft in used as an example of the platform for the data communications network. However, it should be understood that the details of the embodiments discussed could be used and applied to a wide variety of platforms and not just limited to the examples provided here. Turning now to the figures, FIG. 1 is a diagram of aircraft computer system 100, in accordance with the disclosed embodiments. The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of storing, maintaining, and executing Electronic Flight Bag (EFB) applications. In other embodiments, the computing device 102 may be implemented using a computer system onboard the aircraft 104.

The aircraft 104 may be implemented as an airplane, helicopter, spacecraft, hovercraft, or the like. The one or more avionics systems 106 may include a Flight Management System (FMS), navigation devices, weather detection devices, radar devices, communication devices, brake systems, and/or any other electronic system or avionics system used to operate the aircraft 104. Data obtained from the one or more avionics systems 106 may include, without limitation: flight data, aircraft heading, aircraft speed, aircraft position, altitude, descent rate, position of air spaces surrounding a current flight plan, activity of air spaces surrounding a current flight plan, or the like.

The server system 108 may include any number of application servers, and each server may be implemented using any suitable computer. In some embodiments, the server system 108 includes one or more dedicated computers. In some embodiments, the server system 108 includes one or more computers carrying out other functionality in addition to server operations. The server system 108 may store and provide any type of data. Such data may include, without limitation: flight plan data, aircraft parameters, avionics data and associated user actions, and other data compatible with the computing device 200.

The computing device 102 is usually located onboard the aircraft 104, and the computing device 102 communicates with the one or more avionics systems 106 via wired and/or wireless communication connection. The computing device 102 and the server system 108 may both be located onboard the aircraft 104. In other embodiments, the computing device 102 and the server system 108 may be disparately located, and the computing device 102 communicates with the server system 108 via the data communication network 110 and/or via communication mechanisms onboard the aircraft 104.

The data communication network 110 may be any digital or other communications network capable of transmitting messages or data between devices, systems, or components. In certain embodiments, the data communication network 110 includes a packet switched network that facilitates packet-based data communication, addressing, and data routing. The packet switched network could be, for example, a wide area network, the Internet, or the like. In various embodiments, the data communication network 110 includes any number of public or private data connections, links or network connections supporting any number of communications protocols. The data communication network 110 may include the Internet, for example, or any other network based upon TCP/IP or other conventional protocols. In various embodiments, the data communication network 110 could also incorporate a wireless and/or wired telephone network. such as a cellular communications network for communicating with mobile phones, personal digital assistants, and/or the like. The data communication network 110 may also incorporate any sort of wireless or wired local and/or personal area networks, such as one or more IEEE 802.3. IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

In exemplary embodiments, an existing flight management computer (FMC) (or flight management system (FMS)) onboard an aircraft is utilized to communicate data between existing onboard avionics systems or line-replaceable units (LRUs) and another module coupled to the FMC, which supports or otherwise performs new flight management functionality that is not performed by the FMC. For example, a multifunction control and display unit (MCDU) may support or otherwise perform new flight management functionality based on data from onboard avionics or LRUs received via the FMC. In this regard, the FMC is configured to receive operational or status data from one or more avionics systems or LRUs onboard the aircraft at corresponding avionics interfaces and convert one or more characteristics of the operational data to support communicating the operational data with the MCDU. For purposes of explanation, the subject matter may primarily be described herein in the context of converting operational data received from onboard avionics or LRUs in a first format (e.g., an avionics bus format) into another format supported by the interface with the MCDU, the subject matter described herein is not necessarily limited to format conversions or digital reformatting, and may be implemented in an equivalent manner for converting between other data characteristics, such as, for example, different data rates, throughputs or bandwidths, different sampling rates, different resolutions, different data compression ratios, and the like.

Figure 2:
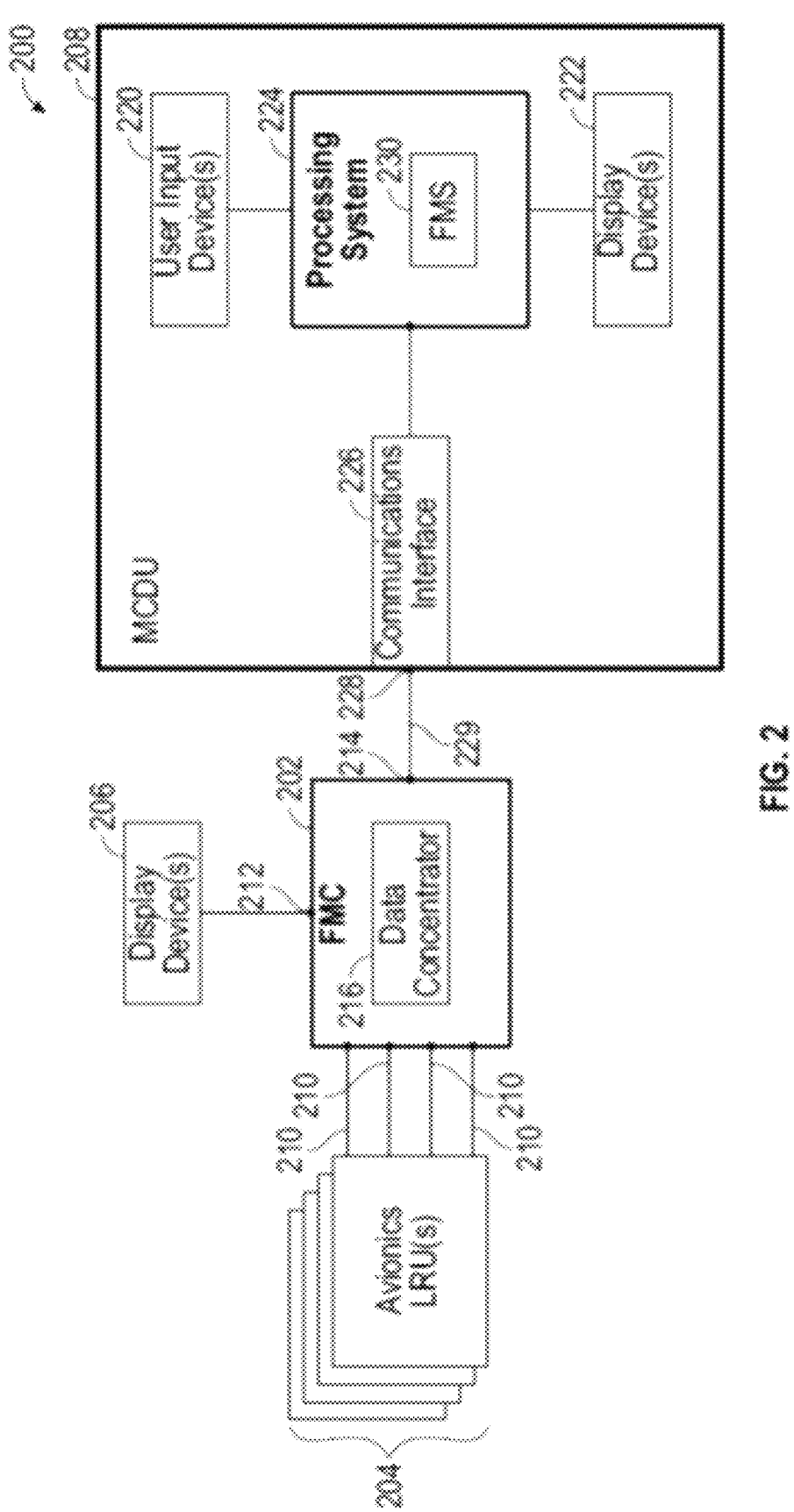
FIG. 2 depicts an data communications network that includes a flight management computing module coupled to a plurality of onboard avionics line replaceable units (LRUs) in accordance with the disclosed embodiments.

FIG. 2 depicts an exemplary embodiment of an aircraft system 200 suitable for implementation onboard an aircraft 104 shown previously in FIG. 1. The illustrated aircraft system 200 includes a flight management computing module 202 communicatively coupled to a plurality of onboard avionics LRUs 204, one or more display devices 206, and a multifunction computing module 208. It should be appreciated that FIG. 2 depicts a simplified representation of the aircraft system 200 for purposes of explanation, and FIG. 2 is not intended to limit the subject matter in any way.

The flight management computing module 202 generally represents the FMC, the FMS, or other hardware, circuitry, logic, firmware and/or other components installed onboard the aircraft and configured to perform various tasks, functions and/or operations pertaining to flight management, flight planning, flight guidance, flight envelope protection, four-dimensional trajectory generation or required time of arrival (RTA) management, and the like. Accordingly, for purposes of explanation, but without limiting the functionality performed by or supported at the flight management computing module 202, the flight management computing module 202 may alternatively be referred to herein as the FMC. The FMC 202 includes a plurality of interfaces 210 configured to support communications with the avionics LRUs 204 along with one or more display interfaces 212 configured to support coupling one or more display devices 206 to the FMC 202. In the illustrated embodiment, the FMC 202 also includes a communications interface 214 that supports coupling the multifunction computing module 208 to the FMC 202.

The FMC 202 generally includes a processing system designed to perform flight management functions, and potentially other functions pertaining to flight planning, flight guidance, flight envelope protection, and the like. Depending on the embodiment, the processing system could be realized as or otherwise include one or more processors, controllers, application specific integrated circuits, programmable logic devices, discrete gate or transistor logics, discrete hardware components, or any combination thereof. The processing system of the FMC 202 generally includes or otherwise accesses a data storage element (or memory), which may be realized as any sort of non-transitory short or long term storage media capable of storing programming instructions for execution by the processing system of the FMC 202. In exemplary embodiments, the data storage element stores or otherwise maintains code or other computer-executable programming instructions that, when read and executed by the processing system of the FMC 202, cause the FMC 202 to implement, generate, or otherwise support a data concentrator application 216 that performs certain tasks, operations, functions, and processes described herein.

The avionics LRUs 204 generally represent the electronic components or modules installed onboard the aircraft that support navigation, flight planning, and other aircraft control functions in a conventional manner and/or provide real-time data and/or information regarding the operational status of the aircraft to the FMC 202. For example, practical embodiments of the aircraft system 200 will likely include one or more of the following avionics LRUs 204 suitably configured to support operation of the aircraft: a weather system, an air traffic management system, a radar system, a traffic avoidance system, an autopilot system, an autothrottle (or autothrust) system, a flight control system, hydraulics systems, pneumatics systems, environmental systems, electrical systems, engine systems, trim systems, lighting systems, crew alerting systems, electronic checklist systems, and/or another suitable avionics system.

In exemplary embodiments, the avionics interfaces 210 are realized as different ports, terminals, channels, connectors, or the like associated with the FMC 202 that are connected to different avionics LRUs 204 via different wiring, cabling, buses, or the like. In this regard, the interfaces 210 may be configured to support different communications protocols or different data formats corresponding to the respective type of avionics LRU 204 that is connected to a particular interface 210. For example, the FMC 202 may communicate navigation data from a navigation system via a navigation interface 210 coupled to a data bus supporting the ARINC 424 (or A424) standard, the ARINC 629 (or A629) standard, the ARINC 422 (or A422) standard, or the like. As another example, a datalink system or other communications LRU 204 may utilize an ARINC 619 (or A619) compatible avionics bus interface for communicating datalink communications or other communications data with the FMC 202.

The display device(s) 206 generally represent the electronic displays installed onboard the aircraft in the cockpit, and depending on the embodiment, could be realized as one or more monitors, screens, liquid crystal displays (LCDs), a light emitting diode (LED) displays, or any other suitable electronic display(s) capable of graphically displaying data and/or information provided by the FMC 202 via the display interface(s) 212. Similar to the avionics interfaces 210, the display interfaces 212 are realized as different ports, terminals, channels, connectors, or the like associated with the FMC 202 that are connected to different cockpit displays 206 via corresponding wiring, cabling, buses, or the like. In one or more embodiments, the display interfaces 212 are configured to support communications in accordance with the ARINC 661 (or A661) standard. In one embodiment, the FMC 202 communicates with a lateral map display device 206 using the ARINC 702 (or A702) standard.

In exemplary embodiments, the multifunction computing module 208 is realized as a multifunction control and display unit (MCDU) that includes one or more user interfaces, such as one or more input devices 220 and/or one or more display devices 222 (shown previously as 106 in FIG. 1), a processing system 224, and a communications module 226. The MCDU 208 generally includes at least one user input device 220 that is coupled to the processing system 224 and capable of receiving inputs from a user, such as, for example, a keyboard, a key pad, a mouse, a joystick, a directional pad, a touchscreen, a touch panel, a motion sensor, or any other suitable user input device or combinations thereof. The display device(s) 222 may be realized as any sort of monitor. screen, LCD, LED display, or other suitable electronic display capable of graphically displaying data and/or information under control of the processing system 224.

The processing system 224 generally represents the hardware, circuitry, logic, firmware and/or other components of the MCDU 208 configured to perform the various tasks, operations, functions and/or operations described herein. Depending on the embodiment, the processing system 224 may be implemented or realized with a general purpose processor, a microprocessor, a controller, a microcontroller, a state machine, an application specific integrated circuit, a field programmable gate array, any suitable programmable logic device, discrete gate or transistor logic, discrete hardware components, or any combination thereof, designed to perform the functions described herein. Furthermore, the steps of a method or algorithm described in connection with the embodiments disclosed herein may be embodied directly in hardware, in firmware, in a software module executed by the processing system 224, or in any practical combination thereof. In this regard, the processing system 224 includes or accesses a data storage element (or memory), which may be realized using any sort of non-transitory short or long term storage media, and which is capable of storing code or other programming instructions for execution by the processing system 224. In exemplary embodiments described herein, the code or other computer-executable programming instructions, when read and executed by the processing system 224, cause the processing system 224 to implement with an FMS 230 (shown previously as 104 in FIG. 1) additional tasks, operations, functions, and processes described herein.

The communications module 226 generally represents the hardware, module, circuitry, software, firmware and/or combination thereof that is coupled between the processing system 224 and a communications interface 228 of the MCDU 208 and configured to support communications between the MCDU 208 and the FMC 202 via an electrical connection 229 between the MCDU communications interface 228 and the FMC communications interface 214. For example, in one embodiment, the communications module 226 is realized as an Ethernet card or adapter configured to support communications between the FMC 202 and the MCDU 208 via an Ethernet cable 229 provided between Ethernet ports 214, 228. In other embodiments, the communications module 226 is configured to support communications between the FMC 202 and the MCDU 208 in accordance with the ARINC 429 (A429) standard via an A429 data bus 229 provided between A429 ports 214, 228 of the respective modules 202, 208. In yet other embodiments, the communications module 226 is configured to support communications between the FMC 202 and the MCDU 208 in accordance with the ARINC 422 (A422) standard via an A422 data bus 229 provided between A422 ports 214, 228 of the respective modules 202, 208. In yet other embodiments, the communications module 226 is configured to support communications between the FMC 202 and the MCDU 208 in accordance with the ARINC 739 (A739) standard via an A739 data bus 229 provided between A739 ports 214, 228 of the respective modules 202, 208.

In various embodiments, the FMC 202 and MCDU 208 communicate using a different communications protocol or standard than one or more of the avionics LRUs 204 and/or the display devices 206. In such embodiments, to support communications of data between the MCDU 208 and those LRUs 204 and/or display devices 206, the data concentrator application 216 at the FMC 202 converts data from one format to another before retransmitting or relaying that data to its destination. For example, the data concentrator application 216 may convert data received from an avionics LRU 204 to the A429 or Ethernet format before providing the data to the MCDU 208, and vice versa. Additionally, in exemplary embodiments, the FMC 202 validates the data received from an avionics LRU 204 before transmitting the data to the MCDU 208. For example, the FMC 202 may perform debouncing, filtering, and range checking, and/or the like prior to converting and retransmitting data from an avionics LRU 204.

It should be noted that although the subject matter may be described herein in the context of the multifunction computing module 208 being realized as an MCDU, in alternative embodiments, the multifunction computing module 208 could be realized as an electronic flight bag (EFB) or other mobile or portable electronic device. In such embodiments, an EFB capable of supporting an FMS 230 application may be connected to an onboard FMC 202 using an Ethernet cable 229 to support flight management functionality from the EFB in an equivalent manner as described herein in the context of the MCDU.

In one or more embodiments, the MCDU 208 stores or otherwise maintains programming instructions, code, or other data for programming the FMC 202 and transmits or otherwise provides the programming instructions to the FMC 202 to update or otherwise modify the FMC 202 to implement the data concentrator application 216. For example, in some embodiments, upon establishment of the connection 229 between modules 202, 208, the MCDU 208 may automatically interact with the FMC 202 and transmit or otherwise provide the programming instructions to the FMC 202, which, in turn, executes the instructions to implement the data concentrator application 216. In some embodiments, the data concentrator application 216 may be implemented in lieu of flight management functionality by the MCDU 208 reprogramming the FMC 202. In other embodiments, the FMC 202 may support the data concentrator application 216 in parallel with flight management functions. In this regard, the FMC 202 may perform flight management functions, while the FMS 230 application on the MCDU 208 supplements the flight management functions to provide upgraded flight management functionality within the aircraft system 200.

Disclosed embodiments provided secured data communications connections solution between various edge nodes that can fetch data from various systems and transmit the data to be viewed on mobile devices. An "edge" or "edge node" is a hardware device with embedded software that can be connected securely to the cloud via wired or wireless connection. "Connected" or "connectivity" is a data communication link available to the cloud via direct or remote connection. In the example embodiments, an edge node in the aircraft is connected to mobile device either through the Bluetooth or Wi-Fi protocol. For these examples, the data connection is described between aircraft edge node and mobile device connected over the Bluetooth protocol. However, alternative protocols such as Wi-Fi could be used in alternative embodiments.

In an embodiment for an aircraft, a secured communication link is established between a handheld Bluetooth device and avionics grade line replaceable unit (LRU). The LRU in aircraft does not typically have an attached display unit. Any two Bluetooth devices trying to pair, will need a user confirmation with an authentication code shown on both devices. A typical authentication code based mechanism is well known to those of ordinary skill in the art and can be easily snooped using various software utilities. Consequently, getting the data securely transmitted from an onboard LRU is a point of concern without being data being comprised by a "man in the middle" attack.

In the present disclosure, the secured method the pairing and transmission between a mobile Bluetooth device and onboard edge device adds a security layer to existing Bluetooth protocol without changing underlying hardware or Bluetooth standard. In these examples, the edge device also known an edge node, is an LRU with wireless transceivers that can be paired to handheld mobile device. The LRUs provide support for various aircraft data, controls and operations of the aircraft such as an engine controller unit (ECU), a cabin management system (CMS), etc.

Figure 3:
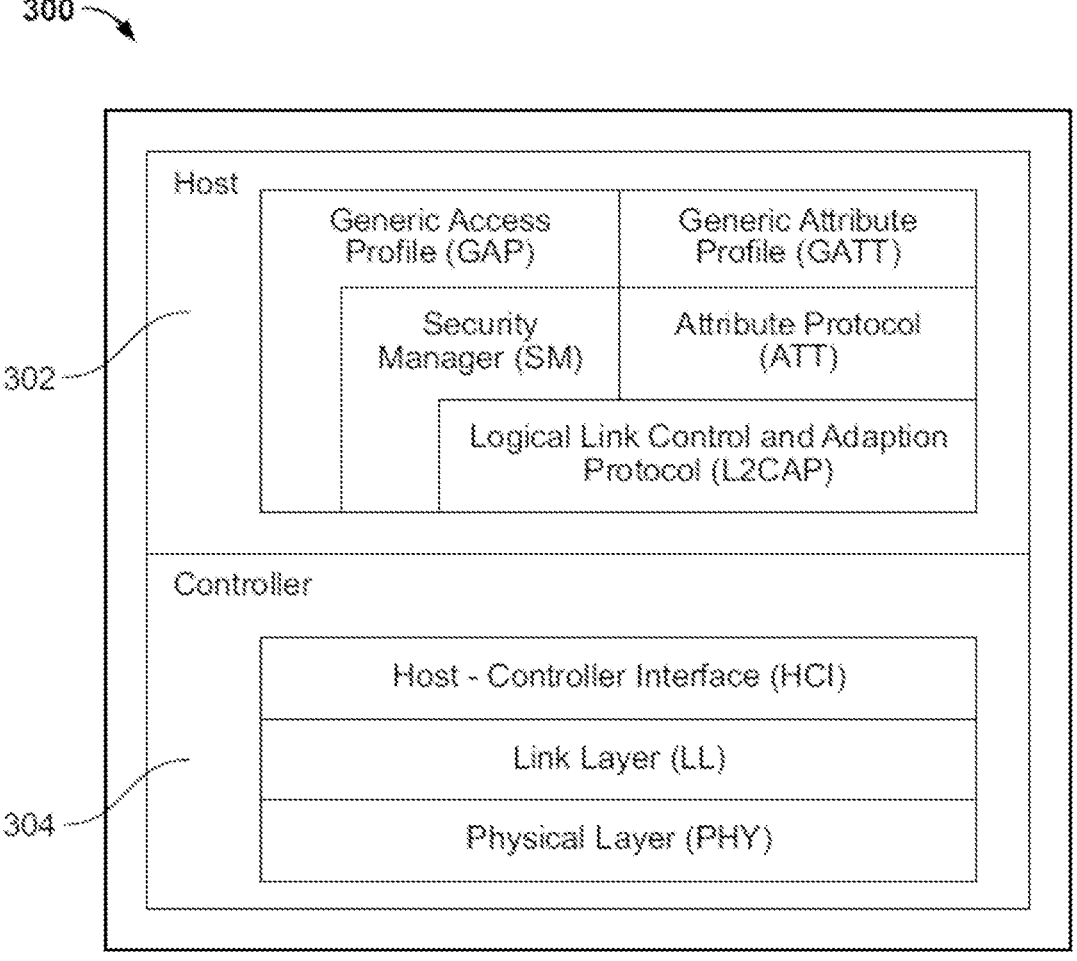
FIG. 3 depicts a block diagram of Bluetooth communication protocol stack layers in accordance with the disclosed embodiments.

FIG. 3 depicts a block diagram 300 of Bluetooth communication protocol stack layers in accordance with the disclosed embodiments. The stack layers include a host stack layer 302 and a controller stack layer 304. The host layer 302 includes a general access profile (GAP) and a generic attribute profile (GATT). The GATT is a protocol for profile management on the Bluetooth stack. Beneath the GAP and GATT is a security manager (SM) and an attribute protocol (ATT). A logical link control and adaptation protocol (L2CAP) layer is between the ATT and the host 302 and controller 304 interface. The controller layer 304 includes a host-controller interface (HCI), a link layer (LL) and a physical layer (PHY).

The disclosed Bluetooth pairing technique uses authentication code generated by the SM layer and shared to application through Bluetooth ATT layer. A digital certificate (DC) based mobile device authentication is used during every pairing. The data exchange protected by dynamic Rivest-Shamir-Adelman (RSA) encryption. RSA is a public key cryptographical system for data encryption and decryption. This technique has the advantage of provided a secure data communication link between a node and a mobile device without requiring a change to the underlying Bluetooth stack. This is sustainable without regards to required upgrades to a mobile device operation system (e.g., iOS or Android updates). It also doesn't require an underlying hardware change on the edge node or mobile device.

In an example embodiment of the operation of a secured pairing and data exchange, the host device (i.e., edge node) and mobile user both need to sign into a digital certificate generation server in to generate digital certificate (DC) for both the node and mobile device. During the pairing, the mobile device scans for the edge node GATT profile and mobile device tries to send its the GATT properties. Once GATT properties are matching and if the mobile device is not paired yet, the mobile device hardware will initiate the pairing process. The pairing is handled by lower level layers (i.e., L2CAP and LL).

The edge node will generate a pairing key (encoded and encrypted) in response to the GATT read response. The pairing key is generated by the SM layer and it is passed to GATT profile (internally) so that can be shared to mobile device. The mobile device can only show the pairing key (decoded) for short time period (e.g., 30 second), so that user can enter the key on the mobile application. The handshake between the node and device happens a lower layer than that application layer on the devices. Upon pairing success, device bonding is initiated to encrypt the communication channel. If pairing fails, then the process starts over. "Bonding" is a process where entire data channel is encrypted using the predefined certificate downloaded in the mobile device. The edge node also has certificate of its own as part of the DC registration and generation. The data channel will be encrypted by long term keys (LTK). These keys will be generated using RSA public keys.

Figure 4:
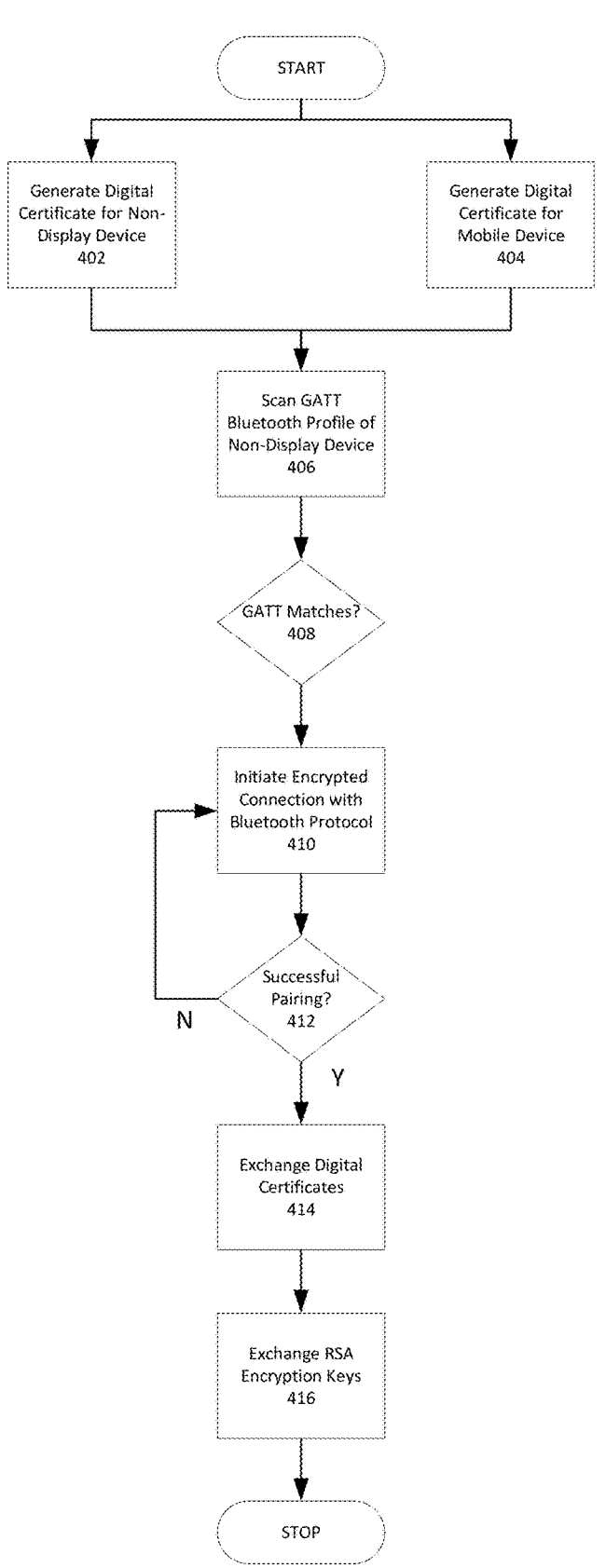
FIG. 4 depicts a flowchart for a method for establishing a secured connection for data transmission in accordance with the disclosed embodiments.

FIG. 4 depicts a flowchart 400 for a method for establishing a secured connection for data transmission in accordance with the disclosed embodiments. A first digital certificate is generated for a non-display device 402. This first digital certificate verifies the identity of the non-display device and enables encrypted connections. A second digital certificate is generated for a mobile device that uses a Bluetooth wireless communications standard protocol 404. The second digital certificate verifies the identity of the mobile device and enables encrypted connections. The mobile device then scans for a generic attribute (GATT) Bluetooth profile of the non-display device 406. Upon matching GATT properties 408, an encrypted connection that utilizes the Bluetooth wireless communications standard protocol is initiated between the non-display device and the mobile device 410. An encrypted data channel is established between the non-display device and the mobile device upon successfully pairing 412 the non-display device and the mobile device by exchanging the first digital certificate and the second digital certificate for authentication 414 and exchanging RSA encryption keys for encryption 416.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for establishing a secured connection for data transmission, comprising: generating a first digital certificate for an a line replaceable unit (LRU) comprising a hardware device with embedded software for a secured wireless data communications link, where the first digital certificate verifies the identity of the LRU and enables encrypted connections; generating a second digital certificate for a mobile device that uses a Bluetooth wireless communications standard protocol, where the second digital certificate verifies the identity of the mobile device and enables encrypted connections; scanning for a generic attribute (GATT) Bluetooth profile of the LRU with the mobile device; generating an encrypted pairing key for the LRU and sharing it with the mobile device through the GATT Bluetooth profile upon matching the GATT properties of the LRU with the mobile device; initiating an encrypted connection between the LRU and the mobile device using the encrypted pairing key, where the encrypted connection utilizes the Bluetooth wireless communications standard protocol;

and establishing an encrypted data channel between the LRU and the mobile device upon successfully pairing the LRU and the mobile device by, exchanging the first digital certificate and the second digital certificate for authentication, and exchanging rivest-shamir-adelman (RSA) encryption keys between the and the mobile device for data encryption.

2. The method of claim 1, where the LRU is located on board an aircraft.

3. The method of claim 1, where the LRU supports navigation of the aircraft.

4. The method of claim 1, where the LRU supports flight planning of the aircraft.

5. The method of claim 1, where the LRU supports flight control functions of the aircraft.

6. The method of claim 1, where the LRU supports flight operational systems of the aircraft.

7. The method of claim 1, where the mobile device comprises an electronic flight bag (EFB) for an aircraft.

8. The method of claim 1, where the mobile device comprises an electronic tablet.

9. The method of claim 1, where the mobile device comprises a smart phone.

10. A system for establishing a secured connection for data transmission, comprising: a line replaceable unit (LRU) that generates a first digital certificate that verifies the identity of the non display device LRU and enables encrypted connections; a mobile device that uses a Bluetooth wireless communications standard protocol, where the mobile device generates a second digital certificate that verifies the identity of the mobile device and enables encrypted connections; and a data communications network that, generates an encrypted pairing key for the LRU and sharing it with the mobile device through a generic attribute (GATT) Bluetooth profile upon matching the GATT properties of the LRU with the mobile device;

initiates an encrypted connection between the LRU and the mobile device using the encrypted pairing key, where the encrypted connection utilizes the Bluetooth wireless communications standard protocol, and establishes an encrypted data channel between the LRU and the mobile device upon successfully pairing the LRU and the mobile device by, exchanging the first digital certificate and the second digital certificate for authentication, and exchanging rivest-shamir-adelman (RSA) encryption keys between the LRU and the mobile device for data encryption.

11. The system of claim 10, where the LRU is located on board an aircraft.

12. The system of claim 10, where the LRU supports navigation of the aircraft.

13. The system of claim 10, where the LRU supports flight planning of the aircraft.

14. The system of claim 10, where the LRU supports flight control functions of the aircraft.

15. The system of claim 10, where the LRU supports flight operational systems of the aircraft.

16. The system of claim 10, where the mobile device comprises an electronic flight bag (EFB) for an aircraft.

17. The system of claim 10, where the mobile device comprises an electronic tablet.

18. The system of claim 10, where the mobile device comprises a smart phone.

* * * * *